(No Model.)
J. E. O'SULLIVAN.
COW MILKER.
No. 572,713. Patented Dec. 8, 1896.
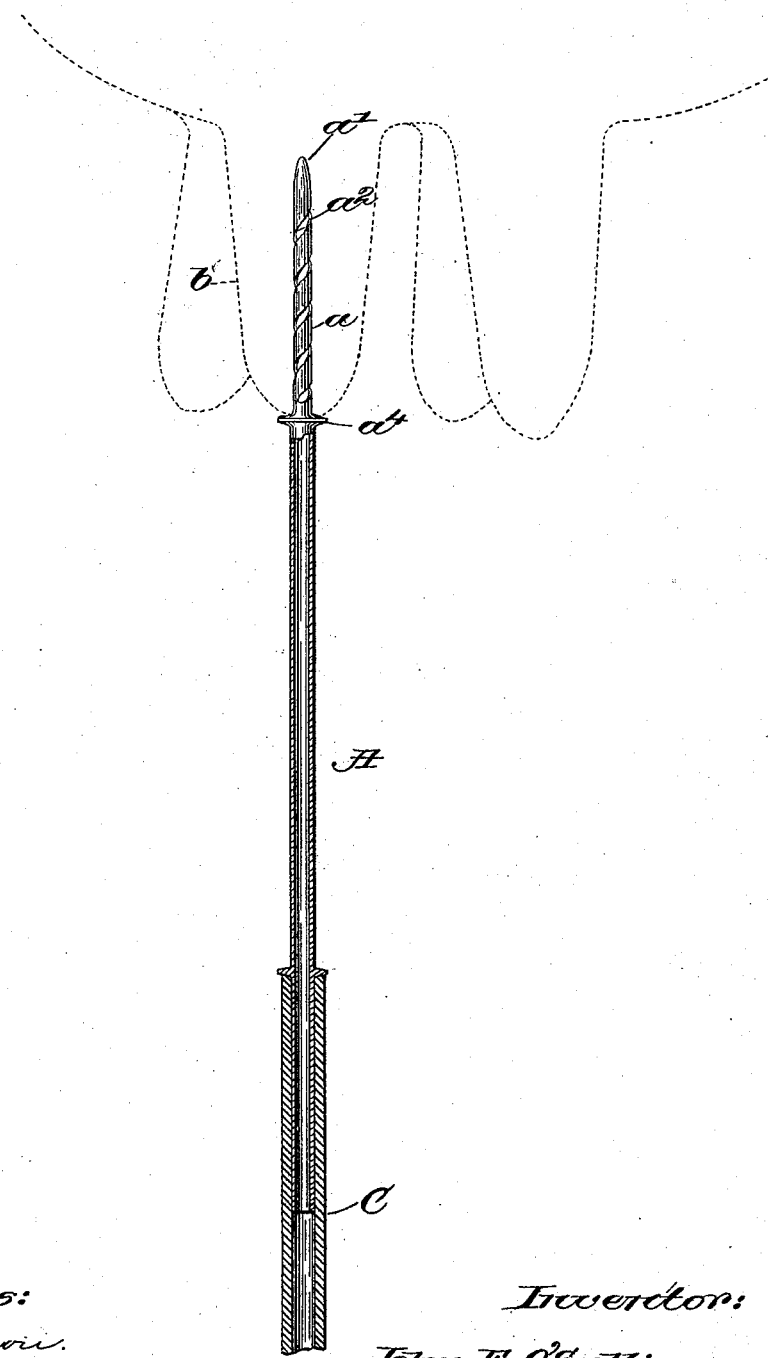

UNITED STATES PATENT OFFICE.

JOHN E. O'SULLIVAN, OF HAYDEN ROW, MASSACHUSETTS, ASSIGNOR OF ONE-HALF TO WILLIAM F. DRAPER, OF HOPEDALE, MASSACHUSETTS.

COW-MILKER.

SPECIFICATION forming part of Letters Patent No. 572,713, dated December 8, 1896.

Application filed February 27, 1896. Serial No. 581,039. (No model.)

*To all whom it may concern:*

Be it known that I, JOHN E. O'SULLIVAN, of Hayden Row, county of Middlesex, State of Massachusetts, have invented an Improvement in Cow-Milkers, of which the following description, in connection with the accompanying drawings, is a specification, like letters on the drawings representing like parts.

My invention relates to automatic milkers, and particularly to those in which a tube is provided for insertion into the teats of the cow and through which the milk may flow into a receptacle suitably placed therefor. Such tubes, made with smooth outer surfaces, are difficult to insert properly and when inserted are liable to drop out. Former use of tubes has been restricted to limited use on sore teats alone, as they have lacked the elements necessary for general application.

My invention is intended for use in general milking as a substitute for the hand method, saving in time and requiring no special skill in the operator. Several cows can be milked at one time by one man, as the tubes deliver without manipulation.

Accordingly I have invented the herein-described improvement in this class of devices, by means of which the tubes can be readily inserted and removed and yet have no liability to drop out, the efficiency of the tube in conducting the milk being also greatly improved.

The accompanying drawing shows my invention in side elevation and partly in section in operative position.

In the present embodiment of my invention A designates a tube of aluminium or other metal, vulcanized rubber, glass, or any other suitable material, which is provided at one end with a preferably reduced portion $a$, slightly tapered or rounded at its free end $a'$, so as to enable the tube to be easily inserted in the teat $b$. (Shown in dotted lines.) In the outer surface of the end $a$ I form a spiral groove $a^2$, herein shown as continuous and extending from adjacent one end of the portion $a$ to the other end. By rotating the tube as it is pushed forward it may be inserted with the utmost ease and gentleness by reason of this spiral groove, the tube being also preferably removed in the same manner.

A further advantage of the groove or grooves $a^2$ is that the tube is thereby firmly retained in place against all liability to drop out. The groove $a^2$ extends entirely through the walls of the tube either for a portion or portions of the length of the part $a$ or throughout the entire length thereof for the passage of the milk from the udder into the tube.

In order to properly limit the length of insertion of the tube A, and also to prevent any leakage from the groove $a^2$ down the outside of the tube, I provide an annular shoulder or stop $a^4$, as shown, slightly removed from the lower end of the groove $a^2$.

A rubber tube or other conduit C may be secured to the lower end of the tube A to conduct the flow of milk to a receptacle therefor, although they are not necessary, provided the milk-pail is in proper position.

The interior diameter of the tube is preferably greater below the stop $a^4$ than it is above the same, in order to secure a better flow of the milk.

I do not wish to be understood as restricting myself in any way to the form of milker herein shown, inasmuch as many changes in form, proportion, and relations of parts may be resorted to without departing from the spirit and scope of my invention.

What I claim is—

In a device of the class described, a milk-conducting tube having a spiral groove extending through its walls, from the exterior to the interior thereof, and through which at any point in the length of the groove the milk may enter laterally from the teat, substantially as described.

In testimony whereof I have signed my name to this specification in the presence of two subscribing witnesses.

JOHN E. O'SULLIVAN.

Witnesses:
JOHN L. PINGREE,
STUART P. WOODBURY.